July 21, 1953
N. R. LONGE
2,645,844
TOOLHOLDER
Filed Nov. 17, 1949
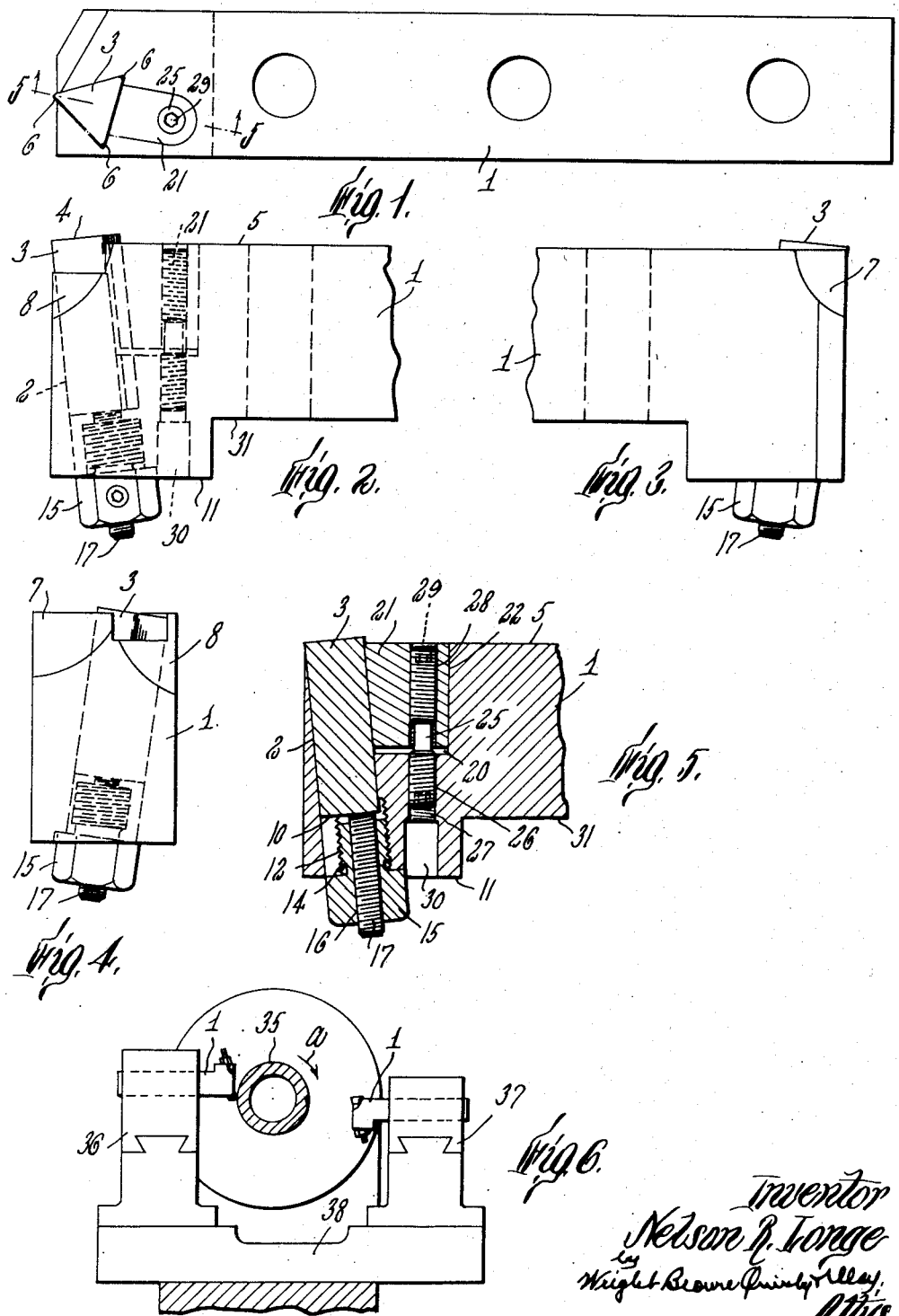

Patented July 21, 1953

2,645,844

UNITED STATES PATENT OFFICE 2,645,844

TOOLHOLDER

Nelson R. Longe, Springfield, Vt., assignor to Jones & Lamson Machine Company, Springfield, Vt., a corporation of Vermont Application November 17, 1949, Serial No. 127,820

5 Claims. (Cl. 29—96)

This invention relates to tool holders and more particularly to holders for tools which comprise bars or bits of hard cutting material, such, for example, as high speed steel or tungsten carbide. Such bars or bits may be backed up as by screws carried by the holder so that the cutting ends or edges may be advanced from time to time to take up wear and grinding.

An object of the present invention is to provide an improved means for clamping the bit in the desired position, the clamping means being so arranged that it is accessible for tightening or loosening from either of opposite sides of the holder.

In certain types of lathes, for example, it may be found desirable to use two tool holders, one on each side of a rotary work piece, in which case, in order to present the cutting edges of both tools to the work piece in proper relation to its direction of rotation, the tool bits must extend in reverse directions, that is, if identical holders and tools are being used in both positions, one must be arranged upside down relative to the other. In accordance with the present invention, therefore, the bit clamping means is so arranged that it is readily actuable to clamp or release the tool bit in whichever of these positions the particular holder may be arranged.

For a complete understanding of this invention, reference may be had to the accompanying drawings in which:

Figure 1 is a top plan view of a tool holder and bit embodying the invention.

Figures 2 and 3 are fragmentary opposite side elevations of the same.

Figure 4 is a front end elevation.

Figure 5 is a detail sectional view on line 5—5 of Figure 1.

Figure 6 is a somewhat diagrammatic transverse sectional view through a lathe of the flat turret type employing a pair of tool holders one on each side of the work.

Referring first to Figures 1 to 5, the tool holder comprises a bar 1 having adjacent to one end a lateral socket portion 2 for the reception of a tool bit 3. As shown this socket 2 is inclined slightly to the perpendicular to the length of the holder and one end portion 4 of the tool bit is arranged to project slightly from the adjacent face 5 of the holder. As shown, the bit 3 is polygonal in cross section and as shown it is a triangular prism, such a bit presenting three cutting edge portions 6 at each end, any selected one of which may be presented into cutting position by properly arranging the tool bit in the socket. The end faces of the tool holder may be cut away as at 7 and 8 so as to present the desired cutting portion of the tool bit extended slightly therefrom, the side portions of the bit, however, being supported closely to the cutting edge by portions of the holder.

The socket 2 does not extend entirely through the holder, but as shown best in Figure 5 terminates at a base portion 10 from which there extends through to the opposite face 11 of the holder an internally threaded bore 12. Within this bore is seated an externally threaded portion 14 of a plug 15. This plug 15 is provided with a polygonal head by which it may be turned and is also provided with an axial internally threaded perforation at 16 for the reception of an externally threaded screw 17. The threaded portion of the plug furnishes means by which the plug can be secured within the threaded perforation 10 and the screw 17 provides an abutment for engagement with the rear or inner end of the tool bit 3 and by manipulation of which the tool bit can be pushed outwardly as desired in order to present the desired length thereof projecting beyond the face 5 of the tool holder. As the bit becomes worn or is ground away in sharpening, the bit may be adjusted so as to extend the desired distance from the tool holder.

The socket 2, as shown best in Figure 5, is provided with a lateral extension 20 within which may ride a wedge locking member 21, the extension 20 having a side wall 22 opposite to the tool bit inclined to the adjacent wall of the tool bit so that by moving the wedge member 21 downwardly as viewed in Figure 5, its tool-engaging face will be wedged thereagainst, while by lifting the wedge 21, relief of this clamping pressure is afforded. The wedge member 21 is provided with means by which it can be moved to clamp or release the tool bit, and as shown this means comprises a differentially threaded screw 25 having threaded engagement within a threaded opening 27 in the tool holder and preferably an oppositely threaded portion 28 threaded into a mating hole within the wedge 21. This differential screw 25 has opposite ends formed by engagement by a turning tool. For example, each end may be provided with a polygonal socket 29 with which may be engaged the mating polygonal projection of a turning tool such as a screwdriver of the Allen type.

The upper end of the screw 25, as viewed in Figures 2 and 5, is accessible for turning from the face 5 of the tool holder, while the lower end of the screw is accessible for turning by a suitable tool engaging therewith through a hole 30 which opens out at the face 11 of the tool holder opposite to the face 5.

In Figure 6 there is shown a lathe provided with a rotary work spindle to which a rotary work piece 35 may be secured by any suitable means, and this work piece is adapted to have operate thereon either of a pair of tools carried by the holders 1 within tool posts 36 and 37 which are arranged on opposite sides of the axis of the work piece. Assuming a direction of rotation of the work piece clockwise as shown by the arrow a of Figure 6, the tool to the right of the work piece will have to be arranged with its cutting portion facing upwardly in order that the direction of rotation of the work piece will present the work properly thereto. The tool holder for the left hand post 36 will have to be arranged in reverse direction, that is, upside down with respect to the right hand tool so as to present the cutting edge downwardly. This arrangement of tool posts is commonly employed, for example, in the well known flat turret lathe, the tool posts being mounted on a single slide or carriage 38 which is movable to present either of the tools selectively into operative position. In whichever direction the tool is faced, therefore, it is an easy matter, with the construction shown, to loosen the tool bit for adjustment and then to tighten it as desired. The right hand tool which faces upwardly is accessible for releasing or clamping of the bit from the face 5 of the tool holder, while the left hand tool holder is accessible for releasing or clamping the tool bit from the face 11.

From the foregoing description of an embodiment of this invention it will be understood by those skilled in the art that various changes and modifications may be made without departing from the spirit or scope of the invention.

I claim:

1. A tool holder having a passage extending laterally thereof, a tool bit seated in said passage and adapted to project therefrom at one face of said holder, said holder having an extension from said passage having a face inclined to the axis of said passage, a wedge member in said extension engaging on one side with said bit and on the opposite side against said inclined face, an element movably carried by said holder and engaging said wedge for moving said wedge relative to said bit to clamp or release said bit in said passage, said element being provided with oppositely disposed engageable means, and said holder having portions formed to facilitate the operative engagement of one of said engageable means from one face of said holder and the operative engagement of the other of said engageable means from the opposite face of said holder.

2. A tool holder having a passage extending laterally thereof, a tool bit seated in said passage and adapted to project therefrom at one face of said holder, and means carried by said holder movable to clamp or release said bit in said passage, said means being provided with oppositely disposed engageable means, one of said engageable means being accessible for actuation from said face of said holder and the other of said engageable means being accessible for actuation from the opposite face of said holder.

3. A tool holder having a lateral passage therein, a tool bit seated in said passage with one end projecting from one side face of said holder, said socket having an extension, a bit clamping wedge movable in said extension from and toward said side face into and out of clamping engagement with said bit, said holder having an opening from said extension through the opposite side face of said holder, and a wedge moving element carried by said holder and operatively engaging said wedge, said element having tool engaging portions at both ends, one of said portions being accessible for actuation of said element from said one side face of said holder and the other of said portions being accessible for actuation of said element through said opening from said opposite side face.

4. A tool holder having a lateral passage therein, a tool bit seated in said passage with one end projecting from one side face of said holder, said socket having an extension, a bit clamping wedge movable in said extension from and toward said side face into and out of clamping engagement with said bit, said holder having an opening from said extension through the opposite side face of said holder, a screw differentially threaded in said opening and in said wedge, said screw having both end portions formed for engagement with a turning tool, one of said end portions being accessible for turning from said one side face and the other end portion being accessible for turning from said opposite side face.

5. A tool holder having a lateral passage therein, a tool bit seated in said passage with one end projecting therefrom, said passage having an extension, a wedge block in said extension and movable therein into and out of clamping engagement with said block, said holder having an opening therethrough threaded for a portion of its length, a screw seated in said threaded portion and threaded with a thread of different pitch through said wedge, said screw having both ends formed for engagement with a turning tool, one of said ends being accessible for engagement for turning from one face of said holder, and the other of said ends being accessible for engagement for turning from the opposite face of said holder.

NELSON R. LONGE.

References Cited in the file of this patent

UNITED STATES PATENTS

| Number | Name | Date |
|---|---|---|
| 739,750 | Warburton | Sept. 22, 1903 |
| 1,968,496 | Madsen | July 31, 1934 |
| 2,357,918 | Trippler | Sept. 12, 1944 |

FOREIGN PATENTS

| Number | Country | Date |
|---|---|---|
| 12,781 | Great Britain | Mar. 16, 1911 |
| 116,863 | Australia | Apr. 20, 1943 |